(12) United States Patent
Taylor et al.

(10) Patent No.: US 8,984,531 B2
(45) Date of Patent: Mar. 17, 2015

(54) EPISODIC COORDINATION MODEL FOR DISTRIBUTED APPLICATIONS

(75) Inventors: John Taylor, Bellevue, WA (US); Justin Brown, Seattle, WA (US); Kenneth Wolf, Seattle, WA (US); Edmund Pinto, Duvall, WA (US); Stefan Batres, Sammamish, WA (US); Nathan Talbert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 13/150,547

(22) Filed: Jun. 1, 2011

(65) Prior Publication Data

US 2012/0311609 A1 Dec. 6, 2012

(51) Int. Cl.
G06F 9/54 (2006.01)
G06F 9/06 (2006.01)
G06F 9/44 (2006.01)
G06F 1/32 (2006.01)

(52) U.S. Cl.
CPC .. *G06F 9/06* (2013.01); *G06F 8/20* (2013.01); *G06F 9/542* (2013.01)
USPC .......................................... 719/313; 718/102

(58) Field of Classification Search
None
See application file for complete search history.

(56) References Cited

U.S. PATENT DOCUMENTS

| | | | |
|---|---|---|---|
| 5,802,267 A | 9/1998 | Shirakihara et al. | |
| 6,529,932 B1 | 3/2003 | Dadiomov et al. | |
| 6,971,096 B1 | 11/2005 | Ankireddipally et al. | |
| 7,502,823 B2 | 3/2009 | Garg et al. | |
| 7,523,164 B2 | 4/2009 | Kantor et al. | |
| 7,681,075 B2 | 3/2010 | Havemose et al. | |
| 8,251,807 B2 * | 8/2012 | LeMay et al. | 463/29 |
| 2004/0024807 A1 | 2/2004 | Cabrera et al. | |
| 2004/0158549 A1 * | 8/2004 | Matena et al. | 707/1 |
| 2007/0277056 A1 * | 11/2007 | Varadarajan et al. | 714/15 |
| 2008/0276253 A1 | 11/2008 | Khandrika et al. | |
| 2008/0320194 A1 * | 12/2008 | Vega et al. | 710/263 |
| 2010/0107177 A1 | 4/2010 | Pinto et al. | |
| 2010/0299556 A1 * | 11/2010 | Taylor et al. | 714/6 |
| 2011/0023040 A1 * | 1/2011 | Hendry et al. | 718/102 |

OTHER PUBLICATIONS

Gerhard Wei"A Multiagent Perspective of Parallel and Distributed Machine Learning".*
Cabrera, Luis Felipe, et al., "An Introduction to the Web Services Architecture and Its Specifications," Version 2.0, MSDN, 2004, (40 pages), downloaded from http://msdn.microsoft.com/en-us/library/ms996441(d=printer).aspx on Apr. 5, 2001.

(Continued)

*Primary Examiner* — Lechi Truong
*Assistant Examiner* — Abdou Seye
(74) *Attorney, Agent, or Firm* — Ben Tabor; Kate Drakos; Micky Minhas

(57) ABSTRACT

An episodic execution of program instances and a coordinated message exchange protocol are combined to achieve eventual consistency in the communication between nodes of a distributed system. Program instances run in episodic loops that are triggered by defined input events and that generate checkpoints. The checkpoints indicate when messages are to be sent from the one instance to another instance or other device. The coordinated message exchange protocol allows the instance to send a message to a receiver, to acknowledge that the message has been received, and to confirm the acknowledgement to the receiver.

16 Claims, 4 Drawing Sheets

(56) References Cited

OTHER PUBLICATIONS

Simpkins, Cliff, "Developing and Managing Service with Windows Server AppFabric," Nov. 17, 2009, (3 pages), downloaded from http://blogs.msdn.com/b/endpoint/archive/2009/11/17/developing-and-managing-services-. . . on Apr. 4, 2011.

Houston, Peter, "Building Distributed Applications with Message Queuing Middleware," MSDN, 2011 (10 pages), downloaded from http://msdn.microsoft.com/en-us/library/cc723260(d=printer).aspx on Apr. 4, 2011.

"International Search Report", Mailed Date: Dec. 27, 2012, Application No. PCT/US2012/039877, Filed Date: May 29, 2012, pp. 9.

* cited by examiner

EPISODIC COORDINATION MODEL FOR DISTRIBUTED APPLICATIONS

BACKGROUND

Distributed applications typically run on a system with multiple nodes. A variety of message exchanges are used by the distributed applications to communicate internally among the nodes. To maintain a consistent state for the overall application, the message exchanges often require a third party coordinator to ensure that the individual nodes send, receive, and process these messages without failure. The third party coordinator allows the entire exchange to be rolled back, if needed, and provides proper compensating logic. In a typical distributed application, a distributed transaction coordinator must be deployed and managed on each node of the system. The developer must explicitly opt-in to using transactions in the third party coordinator program. However, in certain environments, such as cloud computing, where such third party coordinators are unavailable, the developer bears the burden to ensure consistency in the messaging exchanges.

SUMMARY

A state-coordination protocol and an episodic execution model may be used to achieve eventual consistency in a distributed application without the need for a distributed transaction coordinator. This eliminates the burden of deploying and managing a distributed transaction coordinator node and simplifies the programming model so that all messaging interactions can participate seamlessly. Embodiments provide an asynchronous messaging system that is suitable for long-running distributed applications that require consistency in high-scale cloud computing environments. This system can be combined with a continuation-based runtime to provide a high-scale workflow system that relies on eventual consistency.

One embodiment combines episodic execution of a program and a message exchange protocol to coordinate the states of nodes in the distributed application. A combination of episodic execution and message-exchange protocol is leveraged to achieve eventual consistency in communication between nodes in a distributed system. The execution of an instance takes place as a series of episodes.

In another embodiment, an episodic execution model matches a message state with an application state. The matching is based on application entry points, such as application-level or system-level messages, that are required by the application to determine whether it is ready for execution. Program logic is used to match messages with their corresponding application entry point. The episodic execution model collects output data and writes, such as outgoing messages, before checkpointing. An episode of execution takes a message state and an application state together as an input and generates a set of writes, a set of application resumption points, and an updated application state. The episodes are idempotent and tolerant to machine or network failures when durable state storage is used.

An episodic execution loop begins in a match-events state during which the program is waiting for specific input events. When a relevant event is detected, the episode begins and the program moves to an execute-program state. During the execute-program state, outputs may be generated, and ready entrypoints and resumption points may be identified. When the program can proceed no farther without additional inputs, the episode moves to a checkpoint state in which a processed input event, an application state, and relevant message states are recorded. Following the checkpoint state, the process moves to a send and confirm state in which any outgoing messages identified in the execute-program state are sent. The episode then returns to the match-events state to wait for a new input event. This mechanism runs within the infrastructure, and the application itself is unaware of how the messages or events are handled by the infrastructure. The application generates an event or a message to be sent, identifies events or messages that it is now willing to accept, and identifies some state it would like back when one of the events or messages arrive. A message may be, for example, a piece of data to be transferred to an address. The application or use does not need to need to be concerned with how the episode is processed because that is handled by the infrastructure.

A sender-initiated pair-wise message-exchange protocol may be used for state coordination. The message-exchange protocol retries, confirms, and acknowledges sending and receiving messages while detecting and discarding duplicates. The protocol is optimized for idempotent operations by reducing the number of messages required for consistency such that no confirmation messages needed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DRAWINGS

DETAILED DESCRIPTION

Figure 1:
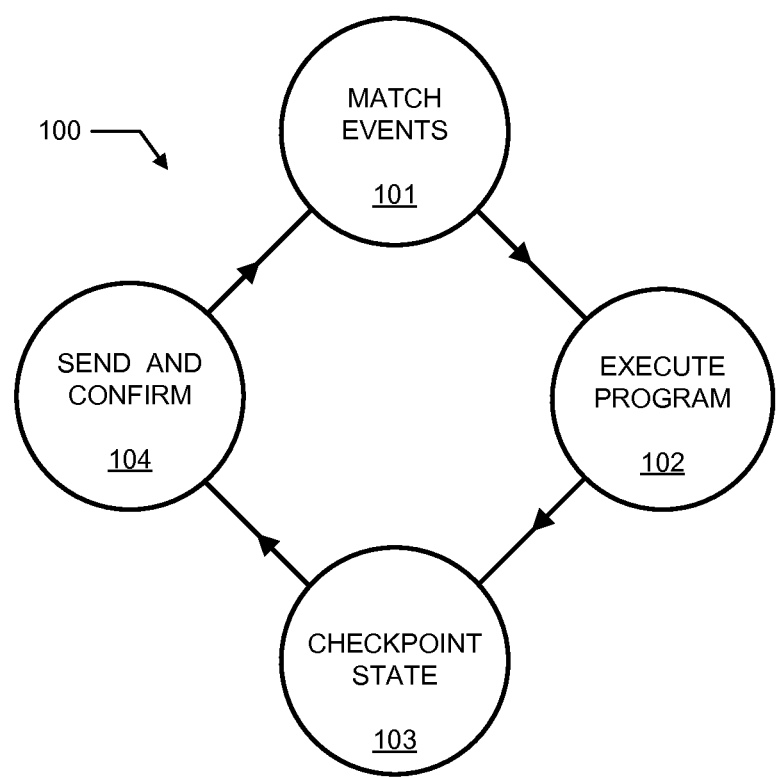
FIG. 1 is a high-level illustration of an episodic execution loop.

Large computing systems are comprised of multiple distributed applications. The applications are responsible for handling processing logic and executing long-running business processes that may last weeks, months, or even years. The applications are isolated except for access to a shared network. The applications communicate by sending messages over this network. The execution of the processes takes place over a large number of physical computing resources. A distributed application is comprised of a large number of individual program definitions. Each program executes in isolation and may communicate with other programs only via an asynchronous message exchange. An executing program is referred to as an "instance." At any one time, there may be a large number of individual instances executing for any of the program definitions. The instances are executed under the management of an instance runtime.

An individual "episode" is a run of execution triggered by an event. Each episode is one of many episodes that will occur over the course of the instance's lifetime, which can potentially span days, months, or even years. Each episode of instance execution is a logical continuation of the previous episode's execution. An episode continues until all the outstanding control flow paths of the instance are waiting on more input. At this stage, the instance will have completed what it can do and will become idle while waiting for new inputs. At this idle point, the instance is described as reaching a "checkpoint." The instance's state may be saved in preparation for the next event.

An episode is triggered by and runs in response to an incoming stimulus known as an "event." The event may be associated with a current time value. Execution of the event may be cancelled at any time. As noted above, the result of running an episode is a set of data to be used for checkpointing. The episode is logically a function to be executed on the instance. The event, the current time, the current instance state, and the cancellation data are parameters for the function, and the checkpoint data is the return value of the function in this model.

The checkpoint data carries the complete state of the instance and carries any outbound communication data that needs to be exchanged with other instances. The checkpoint process also acts as an acknowledgement of the event that triggered the episode in the first place. The contents of the checkpoint data are updates to the durable image of the system and represent a point of recovery should there be some system failure. These updates (i.e. everything within a checkpoint data object) are made in an atomic fashion, wherein either all the changes are be made or no changes are made.

In one embodiment, an implementation processes the checkpoint data simply by saving it to durable storage. Alternatively, an optimized implementation may choose to process multiple episodes and gather up checkpoints and merge them before updating durable storage. The episode resulting in a checkpoint represents the most granular unit of work the system executes. The instance represents the widest scope of atomic change.

An instance is in control of what episode it is willing to run next. For every episode that the instance is willing to run, the instance creates a resumption point object. The resumption point object is added to the checkpoint data. In one embodiment, initialization of a new instance is performed by passing "null" as the resumption point used for the first episode. Furthermore, an instance may indicate that it is complete by simply returning an empty set of resumption points within its final checkpoint. Alternatively, the resumption point may contain an application state and output.

Execution of an episode may require some external communication, such as a call to a public web service or a read from a database. The episode may indicate that it has a message to be sent to another instance using an intent-to-send flag. When set, this flag, along with the associated message, are captured at execution time and is stored as part of the application state. When processing a checkpoint, the flag is inspected by the instance runtime to determine if additional work needs to be done or coordinated with the instance execution.

A message-exchange protocol is initiated by a Sender. The Sender is one instance that has reached a checkpoint with an intent-to-send message flag set. The Sender first defines a unique identifier (ID) to represent the message and includes this ID in each subsequent exchange associated with the message, such as sending the message and sending the confirmation associated with that message. The Sender must not move to a next state in the message-sending protocol until it receives a desired acknowledgement. The Sender may choose to replay messages (including the confirmation messages) as appropriate and according to the underlying transport guarantees. A Receiver must respond to and confirm an incoming message with an appropriate acknowledgement. The Receiver must always respond to or confirm the message without regard as to whether the incoming message is an original message or discarded as a duplicate. Duplicate detection may be done by the Receiver based on the unique ID provided in the message.

The message-exchange protocol requires that the underlying communication channel is reliable, and capable of delivering messages in order. For example, TCP and WS-Reliable-Messaging over HTTP are valid communication channels for the message-exchange protocol.

Once all external communication has been completed and acknowledged, the resulting message state is stored with the application state and the instance can once again wait for a new matching event to start the next episode.

FIG. 1 is a high-level illustration of an episodic execution loop 100. Each instance executes as a series of discrete episodes. Each episode follows the states in loop 100. In state 101, the instance is waiting for an input or event to trigger the next episode. The program defines a list of input events that are relevant. The instance waits for one of these events, such as detecting a user input, receiving a message, or the occurrence of a specific time. The events may be, for example, a message that is needed for the workflow to continue executing. If a received message exactly matches one of program's input events, then an episode may be executed. Regardless of whether a match occurs, the pending messages may be stored with the existing application state.

When an input matches a defined event, the episode begins by moving to state 102 where the program is executed. During execution, the application state and message state are loaded and the input events are processed. As the program executes, it may generate outgoing messages, such as messages to other instances, or other outputs, such as graphics or data to be stored to memory. The outgoing messages that will need to be sent are recorded as an "intent-to-send," which may impact the behavior on the checkpoint. State 102 is exited when all branches of execution have progressed to an idle state and are waiting for a new input event. These pending input events are collected together to be stored as part of the checkpoint.

The episode moves to state 103 when the program execution reaches a point wherein it is waiting for a new event before it can move forward. In state 103, the instance records that the original input event was processed so that this same event is not processed again. In the checkpoint state 103, an updated application state is stored to create a recovery point in the case of a failure. The checkpoint state 103 may record, for example, the processed input event, a list of outputs generated during the episode, the new state of the application, and a list of new inputs needed for the application to progress to the next episode. The required new input events may be, for example, additional messages or the occurrence of a particular time.

After recording the checkpoint data, the episode moves to state 104. If one or more intent-to-send output messages are pending, then these messages are sent in the send and confirm state 104. The message processing protocols defined and described below in connection with FIGS. 2 and 3 may be used to send the outgoing messages. Sending messages likely involves further checkpoint updates (of the message state). For example, the messages state may be updated as the messages are sent and confirmed. If the episode has not created any outgoing messages for the instance, then the send and confirm step 104 may be skipped.

After sending any outgoing messages in state 104, the episodic loop returns to match-events stage 101, while the instance waits for additional events that will trigger a new episode.

Figure 2:
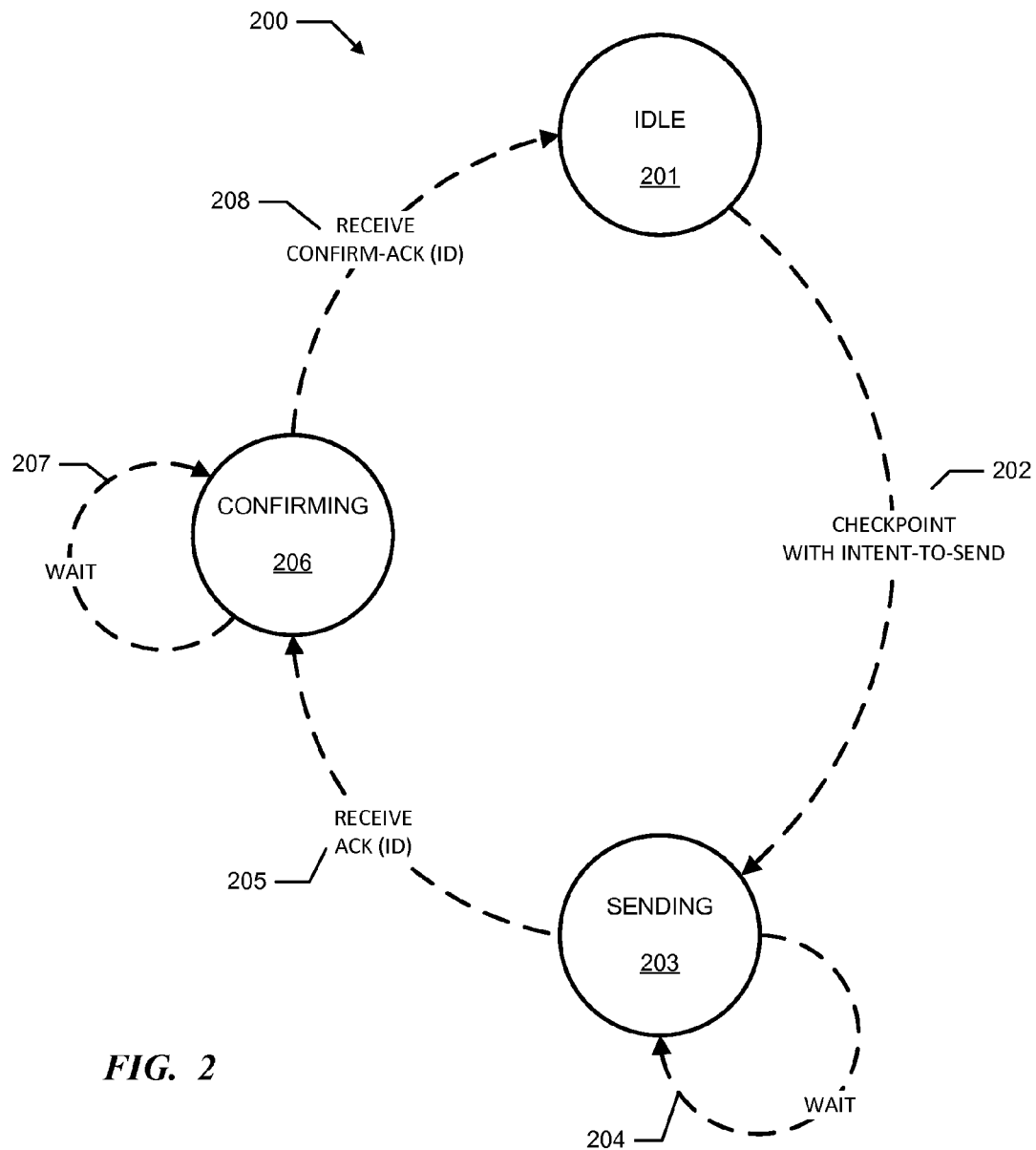
FIG. 2 illustrates sender state transitions according to one embodiment.
Figure 3:
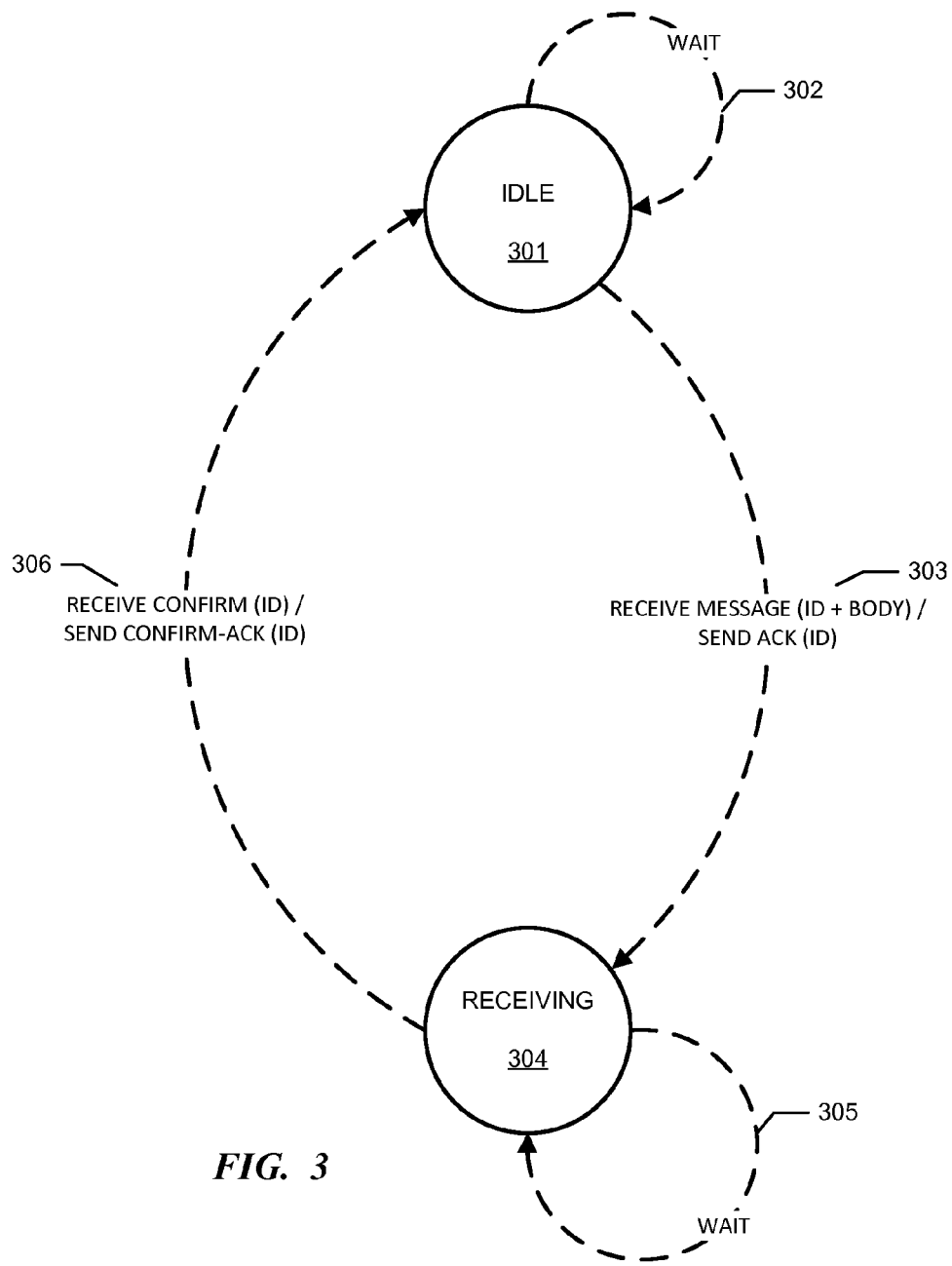
FIG. 3 illustrates receiver state transitions according to one embodiment.

FIGS. 2 and 3 illustrate protocols for coordinating message exchanges between Sender and Receiver entities according to one embodiment. The Sender may be an instance of one program definition, and the Receiver may be another instance for the same or a different program definition. Alternatively, the Sender and/or Receiver may be some other program module, application, or device. Referring to FIG. 1, for example, when the episodic execution loop 100 reaches send and confirm state 104 and an instance has messages to be sent for the current episode, the sending protocol 200 illustrated in FIG. 2 may be used to send those messages to a receiving entity.

In one embodiment, the message-sending protocol 200 may be represented by a state machine. The message-sending protocol begins at Idle state 201, where the Sender waits to identify messages that need to be sent. When the episodic execution loop has checkpointed (i.e. the episodic loop reaches state 104 (FIG. 1)), and determines that it has outgoing messages with an intent-to-send (202), then the message-sending protocol moves from the Idle state 201 to Sending state 203. The Sender instance sends an outgoing message in Sending state 203. The outgoing message comprises a message body and a unique identifier (ID) representing the message. The ID is included in each exchange associated with this message, such as the original message and any acknowledgements or confirmations.

After sending the message, the message-sending protocol waits (204) in Sending state 203 until receiving an acknowledgement (ACK) message (205) from the Receiver. The acknowledgement message includes the message ID and confirms that the Receiver has received the message sent in Sending state 203. Upon receipt of the ACK message (205), the message-sending protocol then moves to Confirming state 206. While waiting (204) without receiving the ACK (205), the Sender may decide that ACK (205) is not forthcoming and may resend the original message to the Receiver. The message-sending protocol again waits (204) for the ACK message (205) before moving to Confirming state 206. The Sender may decide to retry sending the message if, for example, a predetermined waiting period elapses or there are problems with the underlying communication channel, such as if a TCP session fails.

In Confirming state 206, the Sender sends a confirmation message to the Receiver, which includes the original message ID. This confirmation message informs the Receiver that the Sender is aware (based on the acknowledge ACK message (205) that the Receiver has received the original message, and that the Sender is finished with the message. After sending the confirmation message, the message-sending protocol waits (207) in Confirming state 206 until receiving a confirm-acknowledge message (208) from the Receiver. The confirm-acknowledge message (208) also includes the message ID and confirms that the Receiver has received the confirmation message send in Confirming state 206. Upon receipt of the confirm-acknowledge message (208), the message-sending protocol then moves to Idle state 201. Again, while waiting (207) without receiving the confirm-acknowledge message (208), the Sender may decide that confirm-acknowledge message (208) is not forthcoming and may resend the confirmation message to the Receiver. The message-sending protocol again waits (207) for the confirm-acknowledge message (208) before moving to Idle state 201. The Sender may resend the confirmation message, for example, if a predetermined time elapses or if the communication channel fails.

In some embodiments, there is an optional additional tie between the messaging state and the application state for the Sender. In one embodiment, the messaging state machines are maintained as part of the application state. When a messaging state machine transition is available, such as when an acknowledgement (ACK) 205 is received while in the Sending state, the new message-sending state is recorded in the application state. For example, a flag may be set in the application state to indicate that the message sending state machine is moving to the Confirming state. This flag may be, for example, an "intent-to-move-to-the-Sending-state" flag. Once the flag is checkpointed, then the action in the new state—e.g. i.e. sending the confirmation—will be allowed to occur. In this way, current status of the messaging state and the application state are coordinated.

Alternatively, if the messaging state machines are not maintained as part of the application state, then they may be maintained independently in durable storage using a similar mechanism to ensure that the new state is stored before the new state action is performed.

The message-sending protocol illustrated in FIG. 2 operates as a four-way handshake that allows one instance to send messages or data to another instance. The message-sending protocol provides for sending a message, confirming that the message was received, and then allowing the Sender to forget about the message. The four-way handshake is summarized in the following steps:

1) send a message to Receiver;
2) receive an acknowledgement from Receiver indicating the message was received;
3) send a confirmation to Receiver that the Sender is aware the message was received; and
4) receive a confirmation acknowledgement from Receiver indicating the confirmation was received.

The message, acknowledgement, confirmation, and confirmation-acknowledgement each include the same message identifier (ID).

The message-sending protocol illustrated in FIG. 2 is used for each message that is sent by the instance. If an instance generates multiple intend-to-send messages during an episode, then a separate state machine may be used by the Sender to track the status of each message.

FIG. 3 illustrates the state transitions for a message-receiving protocol according to one embodiment. For example, the Receiver will follow message-receiving protocol illustrated in FIG. 3 when a message is received from a Sender. The Receiver begins is in the Idle state 301 while waiting (302) for a received message. When a message (303) is received from the Sender, the Receiver sends an acknowledgement (ACK) message back to the Sender and moves to the Receiving state 304. The Receiver extracts the message identifier (ID) from the message and includes that identifier (ID) in the acknowledgement message. While in the Receiving state 304, the Receiver waits (305) for a confirmation message. While waiting (305), the Receiver may be prompted to resend the acknowledgement as necessary to complete the initial message exchange with the Sender.

When the Receiver receives the confirmation message (306) from the Sender, the Receiver responds with the confirmation-acknowledgement message and moves to the Idle state 301. The Receiver again uses the message identifier (ID) to associate the confirmation message with the original message from the Sender. The Receiver includes the message identifier (ID) in the confirm-acknowledgement message (306). The Receiver may reattempt sending the confirmation-acknowledgement (306) as necessary if prompted by the Sender.

The message-receiving protocol illustrated in FIG. 3 is used for each message that is sent by the instance. If the Receiver receives multiple messages, then a separate state machine may be used by the Receiver to track the status of each message.

As discussed above with respect to the message-sending protocol state machine, the state of the message-receiving protocol may be coordinated with the application state. On the receive side, for example, transmission of the acknowledgement message (303) may be delayed until the received message was incorporated into the application state and checkpointed.

Figure 4:
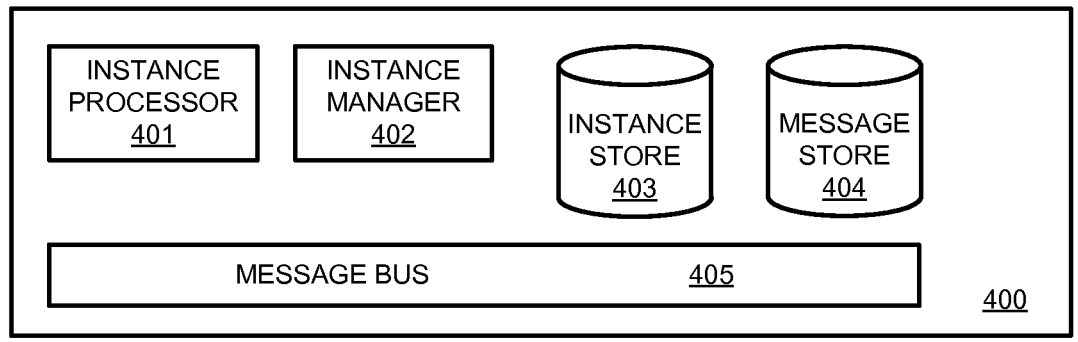
FIG. 4 is a high level block diagram of the components of a distributed instances system according to one embodiment.

FIG. 4 is a high level block diagram of the components of a distributed instances system 400 according to one embodiment. The distributed instances system comprises one or more instance processors 401, which run instances of an application or process. Instance manager 402 controls instance processor 401 and assigns particular instances to run on instance processor 401. Instance manager 402 also monitors the lifetime of each instance and knows when each instance begins and dies.

The instances and application states may be stored in instance storage 403. Although a single storage device 402 is illustrated in FIG. 4, the distributed instance system 400 may include a plurality of storage devices. In other embodiments, external storage devices may be used in addition to or in place of instance store 403. In one embodiment, each instance is bound to one storage device 403 at a time. The instance-storage binding may be changed as part of rebalancing, failover, or migration, as needed. In further embodiments, storage 403 is optional and the instance states and messages are stored within the instance processor 401, which may cause the system to work at a reduced level of reliability. The use of storage device 403 may be a per-instance decision, wherein some instance states and messages may be externalized to storage while others are not. The instances may communicate with other instances for the same or different applications or processes.

Instances running on instance processor 401 may communicate with each other to allow message to be exchanged between instances. Message store 404 may be used to store messages and message states. Instance manager 402 routes messages to and among the system components, such as between instance processor 401, instance store 403, and message store 404, over message bus 405. Instance manager 402 enforces the message exchange patterns that are available on the distributed instance system.

Instance manager 402 is responsible for executing the instances' processing logic and controlling the instances on instance processor 401. The instance manager also manages the instances' lifetime. Control messages may be exchanged between instance manager 402 and instance processor 401 to create new instances and to terminate existing ones. The instance manager is responsible for implementing these commands and, as a result, is aware of the lifetime of all instances. The instance manager is also responsible for handling message exchange between instances. The instance manager 402 is provided with additional knowledge about each message, including which instance sent the message and instance (or instances) should receive the message.

Figure 5:
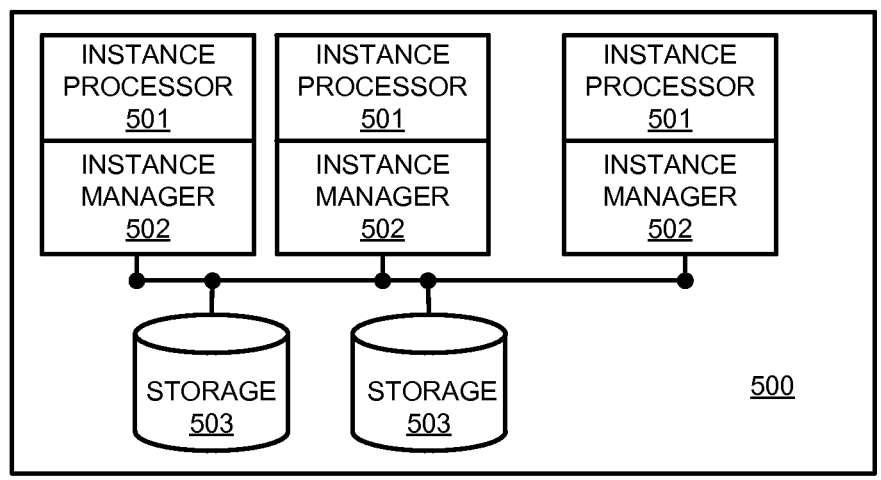
FIG. 5 is a high-level block diagram of the topology of a distributed instances system according to one embodiment.

FIG. 5 is a high-level block diagram of the topology of a distributed instances system 500 according to one embodiment. The instance processors 501 may be implemented as a number of instance processing nodes 501 each under the control of an instance manager 502. An instance storage 503 that holds instances during periods of inactivity as well as application states and message states. The instance processor provides reliable messaging and recoverability in the event of a system failure. However, either of these capabilities may be sacrificed if, for example, neither reliable messaging nor durable instances are required or desired.

The instance manager 502 is responsible for loading the instances' processing logic to the assigned instance processor 501. This allows the system to present a number of additional simplifying benefits to applications, including the capability to load different versions of processing logic and allowing the side-by-side execution of instance versions. For example, a business process that starts with version 1 of an instance's processing logic may continue to use that version, even when version 2 is created. New instances of the business process may automatically leverage the latest version.

Furthermore, the system's capability to represent a business process as a hierarchy of distinct yet coordinated instances significantly reduces the impact of changes to ongoing processes, thereby allowing application developers to model processes as a composition of independently versionable instances.

For very large distributed applications, hundreds or thousands of processing units may be used to run the application's programs on thousands or millions of instance processors. Due the scale-out problems associated with such large numbers of processors and instances, a traditional distributed transaction coordinator is not capable of handling communications for such a distributed application. Instead, the episodic execution loop approach and the coordinated message exchange protocols described above may be used in such a large-scale system wherein a distributed transaction coordinator is not required to track all messages in the system.

The processing units 401, 501 may be separate devices, such as different servers, computers, or equipment racks, or may be separate components on the same device, such as separate processors in a server or computer or separate processor blades in an equipment rack.

Many of the functions described herein may be implemented in hardware, software, and/or firmware, and/or any combination thereof When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

For example, in FIG. 4 storage 403 may be any volatile or non-volatile storage device, such as a hard drive, flash memory, solid state memory, optical disk, CD, DVD, computer program product, or other memory device, that provides computer-readable or machine-readable storage for instance processors 402. The code segments may be downloaded or transferred from storage 403 to instance processors 402 via internal bus 404, another computer network, such as the Internet or an intranet, or via other wired or wireless networks, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    completing an episode of execution of a first instance of first program code running on a processor;

running the episode of execution until a checkpoint state is achieved;

recording checkpoint data;

proceeding to a send and confirm state;

identifying one or more messages to be sent from the first instance to a second instance of second program code;

sending a first message from the first instance to the second instance;

receiving a second message from the second instance, the second message comprising an acknowledgement indicating that the first message was received at the second instance;

sending a third message from the first instance to the second instance, the third message comprising a confirmation indicating that the second message was received at the first instance;

receiving a fourth message from the second instance, the fourth message comprising a confirmation-acknowledgement indicating that the third message was received at the second instance;

compare additional events to a specified new input; and when an additional event matches the specified new input, execute another episode of the instance.

2. The method of claim 1, further comprising:
generating a message identifier for the first message;
including the message identifier in the second, third, and fourth messages.

3. The method of claim 2, further comprising:
associating the second message or the fourth message with the first message using the message identifier.

4. The method of claim 1, further comprising:
identifying duplicate first messages or third messages at the second instance; and
discarding the duplicate messages.

5. The method of claim 1, wherein if the second message or fourth message are not received within a predetermined time, then resending the first message or the third message.

6. The method of claim 1, wherein the first message is sent to the second instance on an external system that is separate from the processor running the first instance.

7. The method of claim 6, wherein the external system is a database, a queue, or a buffer.

8. The method of claim 1, further comprising:
entering a sending state in a message-sending protocol when messages to be sent are identified at the completion of the episode of execution; and
sending the first message while in the sending state.

9. The method of claim 8, further comprising:
waiting in the sending state after sending the first message and before receiving the second message.

10. The method of claim 9, further comprising:
moving to a confirming state in the message-sending protocol after receiving the second message.

11. The method of claim 10, further comprising:
sending the third message while in the confirming state; and
waiting in the confirming state after sending the third message and before receiving the fourth message.

12. The method of claim 11, further comprising:
moving to an idle state after receiving the fourth message.

13. The method of claim 1, wherein the first, second, third, and fourth messages operate as a four-way handshake between the first instance and second instance.

14. The method of claim 1, wherein the first program code and the second program code are the same, and the first instance and the second instance are separate instances of the same program code.

15. A computer system, comprising:
an instance processor; and
system memory storing instructions for managing an episode of execution of a first instance of first program code that, when executed by the instance processor, cause the instance processor to:
run the episode of execution to until a checkpoint state is achieved;
record checkpoint data;
proceed to a send and confirm state;
identify one or more messages to be sent by the processor to a second instance of second program code;
send a first message from the first instance to the second instance;
receive a second message from the second instance, the second message comprising an acknowledgement indicating that the first message was received at the second instance;
send a third message from the first instance to the second instance, the third message comprising a confirmation indicating that the second message was received at the first instance;
receive a fourth message from the second instance, the fourth message comprising a confirmation-acknowledgement indicating that the third message was received at the second instance;
compare additional events to a specified new input; and
when an additional event matches the specified new input, execute another episode of the instance.

16. The system of claim 15, wherein the check point comprises a set of outputs, a set of application resumption points, and an updated application state.

* * * * *